UNITED STATES PATENT OFFICE.

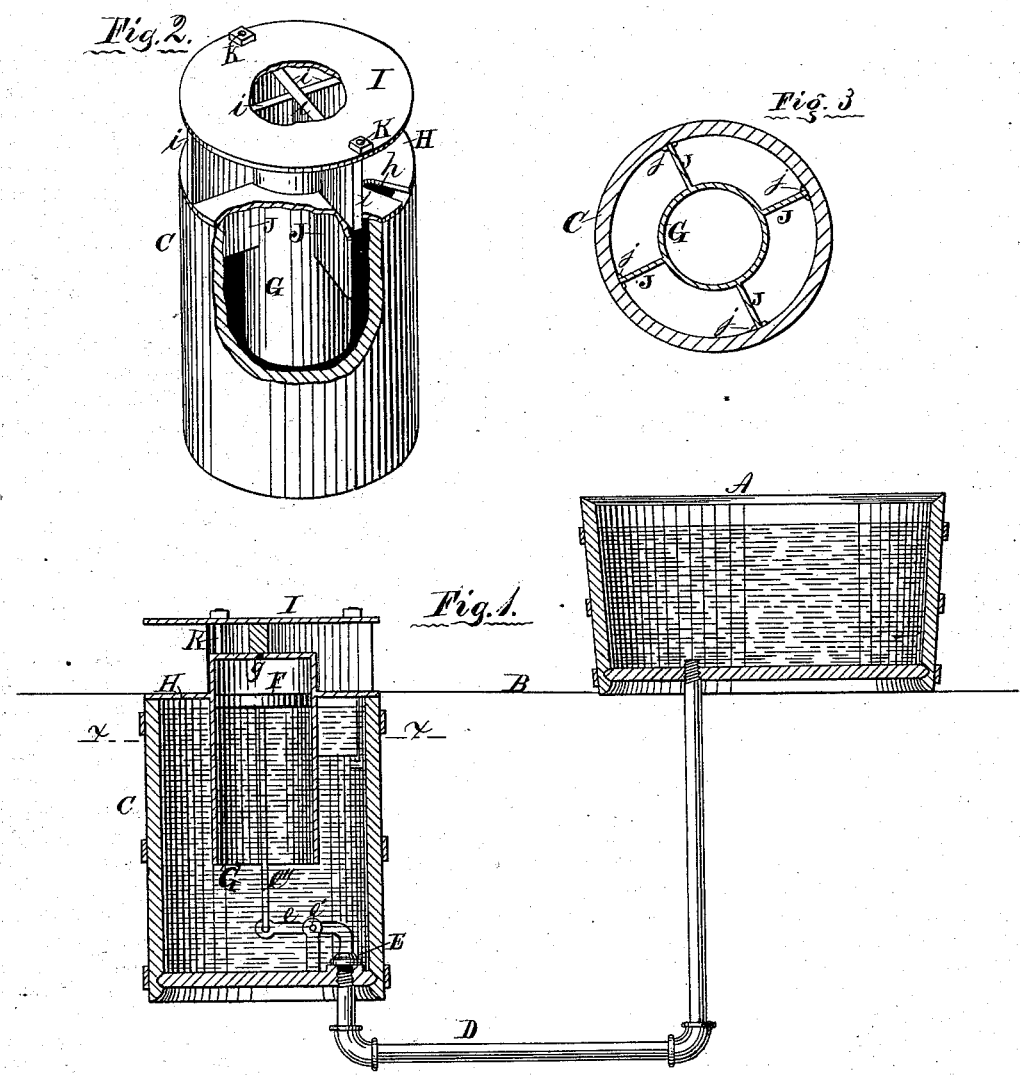

GEORGE A. CARTER, OF PRINCETON, ILLINOIS.

IMPROVEMENT IN WATERING-TANKS FOR HOGS.

Specification forming part of Letters Patent No. 158,905, dated January 19, 1875; application filed June 9, 1874.

*To all whom it may concern:*

Be it known that I, GEORGE A. CARTER, of Princeton, county of Bureau and State of Illinois, have invented certain Improvements in Watering-Tanks for Hogs, of which the following is a specification:

This invention relates to improvements in anti-freezing, self-regulating water-tanks for hogs; and the invention consists, first, in the arrangement of a drinking-tank having a regulating-valve with a supply-reservoir, with which it is connected by a system of pipes; second, an inverted casing for the float within the drinking-tank, to prevent the water freezing in which the said float operates; third, partitions placed between the openings in the cover to prevent the circulation of cold air over the drinking-surface of the water; and, fourth, in the general arrangement of the parts, all as hereinafter fully described.

To enable others skilled in the art to make and use my invention, I will now proceed to describe the same with reference to the accompanying drawing, in which—

Figure 1 is a central vertical sectional view through the supply-tank and the watering-tank. Fig. 2 is a perspective view of the watering or drinking tank and cover, partly broken away; and Fig. 3 is a horizontal sectional view of Fig. 1 on the line *x x*.

Referring to the parts by letters, letter A represents any suitable reservoir, supplied in any desired manner with water, and shown in the drawing as situated immediately above the ground line or surface B. C is the watering or drinking tank, buried beneath the ground, as shown in the drawings. D is a pipe extending from the bottom of the reservoir A to the bottom of the tank C, and communicating with the interior of each. E is a valve, seated upon the entrance of the pipe D to the tank C, and is carried upon one end of a lever, $e$, which is pivoted centrally at $e'$ and provided at its other end with a light rod, $e''$, which extends upward and is provided at its upper end with a float, F. G is a casing, open at its lower end and closed at its upper end, except a small hole, $g$. H is a cover, attached to the casing G and filling the annular space between said casing and the outer circumference of the tank C, and is pierced with radial openings $h$. I is a shield, supported above the cover H by radial arms $e$, its central part shown broken away at Fig. 2. Letters J represent wings projecting radially from the casing G and extending to the interior surface of the tank C, their upper edges attached to the under side of the cover H. One of the wings or partitions J is placed between each pair of the openings $h$. A grooved plate, $j$, is attached to the interior of the tank C, for the reception of each wing J; and the wings J, cover H, casing G, arms $i$, and shield I all being connected may be lifted from or be placed upon the tank C together, the wings J passing down the grooves in the plates J, and thus securing the cover in place. An additional security for the cover may be afforded by rods K, which project upward from the tank C through the cover and shield, and have nuts upon their upper ends.

By regulating the height of the float F upon the rod $e''$ the height to which the water will rise in the tank C may be adjusted as desired, and may be kept a slight distance below the cover H, and within easy reach of the animals, by inserting their snouts through the openings $h$. When the water-level is lowered in the tank C the float F will fall and allow more to enter through the pipe D until the original level is again reached, and the float, by rising again, closes the entrance.

The protection of the shield I and the office of the arms $i$ having been fully described in an application which I now have pending in the United States Patent Office, I do not deem it necessary to explain them further here.

The arrangement of the pipe D below the ground and its freedom from the action of the frost are deemed obvious.

The inverted casing G will not permit ice to form within it and interfere with the action of the float, and the small opening $g$ in its upper end will permit just sufficient air to allow of free action of the float.

The wings J, which extend downward into the water, act as partitions between the openings $h$, and thus prevent currents of air which would arise, especially when the wind was blowing, and entering at one opening pass out at another, and thus in cold weather tend to freeze the water over which it passed. The wings J also aid in securing the parts in place, as hereinbefore described.

Having thus described my invention, what I claim as new, and desire to secure by Letters Patent, is—

1. The tank C, having the float F, rod $e''$, lever $e$, and valve E, operating in combination with the casing G, substantially as and for the purpose specified.

2. The inverted casing G, combined with the float F and tank C, substantially as described, and for the purpose specified.

3. The wings J, arranged to operate with the tank C and perforated top H, substantially as described, and for the purpose specified.

4. The shield I, in combination with the perforated top H, winged casing G, and tank C, substantially as and for the purpose specified.

GEORGE A. CARTER.

Witnesses:
ALBERT H. VEEDER,
A. F. MILLER.